United States Patent
Hrusch

(10) Patent No.: US 11,428,173 B2
(45) Date of Patent: Aug. 30, 2022

(54) CRANKTRAIN PHASE ADJUSTER FOR VARIABLE COMPRESSION RATIO

(71) Applicant: Schaeffler Technologies AG & Co. KG, Herzogenaurach (DE)

(72) Inventor: Nicholas Hrusch, Wooster, OH (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 0 days.

(21) Appl. No.: 17/493,224

(22) Filed: Oct. 4, 2021

(65) Prior Publication Data

US 2022/0106916 A1 Apr. 7, 2022

Related U.S. Application Data

(60) Provisional application No. 63/087,916, filed on Oct. 6, 2020.

(51) Int. Cl.
| | |
|---|---|
| *F02D 15/02* | (2006.01) |
| *F16D 3/10* | (2006.01) |
| *F16H 35/00* | (2006.01) |
| *F02B 75/04* | (2006.01) |
| *F01L 1/344* | (2006.01) |

(52) U.S. Cl.
CPC ............ *F02D 15/02* (2013.01); *F02B 75/047* (2013.01); *F16D 3/10* (2013.01); *F16H 35/008* (2013.01); *F01L 1/344* (2013.01)

(58) Field of Classification Search
None
See application file for complete search history.

(56) References Cited

U.S. PATENT DOCUMENTS

| | | | | |
|---|---|---|---|---|
| 4,922,790 A | * | 5/1990 | Abbott | F16H 1/46 475/341 |
| 5,123,300 A | * | 6/1992 | Himmelein | H02K 51/00 74/395 |
| 6,386,166 B1 | * | 5/2002 | Scott | F01L 1/34403 123/90.37 |

(Continued)

FOREIGN PATENT DOCUMENTS

| | | | | |
|---|---|---|---|---|
| CN | 86107594 A | * | 9/1987 | ............. F01L 1/352 |
| CN | 105042001 A | * | 11/2015 | ........... F16D 23/025 |

(Continued)

OTHER PUBLICATIONS

U.S. Appl. No. 17/350,245, filed Jun. 17, 2021.
Unpublished U.S. Appl. No. 17/324,922, filed May 19, 2021.

*Primary Examiner* — Kevin R Steckbauer
(74) *Attorney, Agent, or Firm* — Volpe Koenig

(57) ABSTRACT

A phase adjuster assembly configured to adjust a phase between a driving component and a driven component of an internal combustion engine is generally provided. The assembly includes an input gear assembly comprising an input gear configured to engage a driving component, and a spline carrier. An output gear assembly includes an output gear configured to engage a driven component, and a drive plate configured to drivingly engage with the spline carrier. Various components disclosed herein are formed as stamped sheet metal components. Additionally, various connections between adjacent components are provided via relative uncomplicated processes, such as welding.

20 Claims, 8 Drawing Sheets

(56) References Cited

U.S. PATENT DOCUMENTS

| | | | | |
|---|---|---|---|---|
| 6,386,167 | B1 * | 5/2002 | Urckfitz | F01L 1/344 123/90.37 |
| 6,405,696 | B1 * | 6/2002 | Borraccia | F01L 1/34406 123/90.37 |
| 6,505,582 | B2 * | 1/2003 | Moteki | F02B 75/048 123/48 B |
| 6,763,787 | B2 * | 7/2004 | Hallenstvedt | F16D 3/10 123/78 D |
| 7,421,990 | B2 * | 9/2008 | Taye | F01L 1/344 123/90.15 |
| 8,516,983 | B2 * | 8/2013 | David | F01L 1/344 123/90.15 |
| 8,584,633 | B2 * | 11/2013 | David | F01L 1/352 123/90.17 |
| 9,200,564 | B2 * | 12/2015 | Blackstock | F02B 75/047 |
| 9,482,161 | B2 * | 11/2016 | Nagai | F02B 75/048 |
| 9,534,513 | B2 * | 1/2017 | David | F01L 1/344 |
| 9,797,307 | B2 * | 10/2017 | Onigata | F02B 75/045 |
| 9,822,701 | B2 * | 11/2017 | Blackstock | F02B 75/047 |
| 9,890,638 | B2 * | 2/2018 | Baker, Jr. | F01B 21/02 |
| 10,138,944 | B2 * | 11/2018 | Brown | F01L 1/352 |
| 10,287,972 | B2 * | 5/2019 | Nagai | F16H 49/001 |
| 10,385,985 | B2 * | 8/2019 | Miyachi | F01L 1/344 |
| 10,514,109 | B2 * | 12/2019 | Miyachi | F16H 1/32 |
| 10,619,578 | B2 * | 4/2020 | Nagai | F02B 75/048 |
| 10,876,473 | B2 * | 12/2020 | Gilges | F16B 33/004 |
| 10,883,421 | B2 * | 1/2021 | Onigata | F02B 75/045 |
| 11,280,263 | B2 * | 3/2022 | Heinbuch | F02B 75/047 |
| 2003/0111028 | A1 * | 6/2003 | Hallenstvedt | F02D 15/04 123/52.4 |
| 2008/0047511 | A1 * | 2/2008 | Taye | F01L 1/352 123/90.15 |
| 2011/0030631 | A1 * | 2/2011 | David | F01L 1/344 464/160 |
| 2013/0081587 | A1 * | 4/2013 | David | F01L 1/344 123/90.17 |
| 2014/0326219 | A1 * | 11/2014 | Blackstock | F02B 75/047 123/48 B |
| 2015/0033906 | A1 * | 2/2015 | Kimus | F16H 35/008 74/568 R |
| 2015/0219009 | A1 * | 8/2015 | Onigata | F02D 15/02 74/586 |
| 2015/0219022 | A1 * | 8/2015 | Nagai | F02B 75/045 123/48 B |
| 2015/0354415 | A1 * | 12/2015 | David | F01L 1/352 123/90.17 |
| 2016/0047301 | A1 * | 2/2016 | Blackstock | F02B 75/047 123/48 B |
| 2016/0168995 | A1 * | 6/2016 | Baker, Jr. | F04B 9/02 92/61 |
| 2017/0198755 | A1 * | 7/2017 | Brown | F16D 3/10 |
| 2017/0254260 | A1 * | 9/2017 | Yamada | F02B 75/04 |
| 2017/0284291 | A1 * | 10/2017 | Zahdeh | F02B 75/045 |
| 2018/0016972 | A1 * | 1/2018 | Nagai | F02B 75/04 |
| 2018/0016975 | A1 * | 1/2018 | Onigata | F02B 75/045 |
| 2018/0073655 | A1 * | 3/2018 | Miyachi | F01L 1/047 |
| 2018/0073656 | A1 * | 3/2018 | Miyachi | F16H 1/32 |
| 2018/0223729 | A1 * | 8/2018 | Gilges | F16H 57/025 |
| 2018/0223730 | A1 * | 8/2018 | Suda | F16H 1/32 |
| 2019/0072044 | A1 * | 3/2019 | Nagai | F16H 49/001 |
| 2019/0186311 | A1 * | 6/2019 | Nagai | F16H 57/043 |
| 2021/0340904 | A1 * | 11/2021 | Heinbuch | F02B 75/045 |
| 2021/0363917 | A1 * | 11/2021 | Hrusch | F02B 75/044 |
| 2021/0396174 | A1 * | 12/2021 | Hrusch | F01L 1/3442 |
| 2022/0049759 | A1 * | 2/2022 | Van Weelden | F16H 35/008 |
| 2022/0106916 | A1 * | 4/2022 | Hrusch | F16D 3/10 |
| 2022/0107013 | A1 * | 4/2022 | Sanekata | F01L 1/356 |
| 2022/0112848 | A1 * | 4/2022 | Hrusch | F02D 15/00 |

FOREIGN PATENT DOCUMENTS

| | | | | |
|---|---|---|---|---|
| CN | 107208550 | A * | 9/2017 | F01B 31/14 |
| CN | 107829793 | A * | 3/2018 | F01L 1/344 |
| CN | 108291483 | A * | 7/2018 | F02B 75/04 |
| CN | 105042001 | B * | 9/2018 | F16D 23/025 |
| CN | 113586259 | A * | 11/2021 | F01L 1/3442 |
| CN | 114076028 | A * | 2/2022 | F16H 35/008 |
| DE | 102004019190 | A1 * | 11/2005 | F01L 1/022 |
| DE | 60122142 | T2 * | 6/2007 | F02D 15/04 |
| DE | 102010006392 | B3 * | 5/2011 | F01L 1/352 |
| DE | 112015002170 | T5 * | 1/2017 | F01L 1/352 |
| DE | 112016000475 | T5 * | 10/2017 | F01B 31/14 |
| DE | 102021106921 | A1 * | 11/2021 | F01L 1/3442 |
| EP | 1292762 | B1 * | 8/2006 | F02D 15/04 |
| EP | 1895114 | A1 * | 3/2008 | F01L 1/344 |
| EP | 2574745 | A1 * | 4/2013 | F01L 1/344 |
| EP | 2574745 | B1 * | 4/2015 | F01L 1/344 |
| EP | 3296530 | A1 * | 3/2018 | F01L 1/344 |
| EP | 3957835 | A1 * | 2/2022 | F16H 35/008 |
| FR | 3090774 | A1 * | 6/2020 | F16D 25/0638 |
| JP | 2015145646 | A * | 8/2015 | F02B 75/045 |
| JP | 2015145647 | A * | 8/2015 | F02B 75/045 |
| JP | 2016138467 | A * | 8/2016 | F01B 31/14 |
| JP | 2017150369 | A * | 8/2017 | F02B 75/04 |
| JP | 6208035 | B2 * | 10/2017 | F02B 75/045 |
| JP | 6208589 | B2 * | 10/2017 | F02B 75/045 |
| JP | 2018044501 | A * | 3/2018 | F01L 1/344 |
| JP | 6384020 | B2 * | 9/2018 | F01B 31/14 |
| JP | 2019157759 | A * | 9/2019 | F01M 1/06 |
| JP | 6589686 | B2 * | 10/2019 | F02B 75/04 |
| JP | 2020101118 | A * | 7/2020 | F02D 15/02 |
| JP | 6790640 | B2 * | 11/2020 | F01L 1/344 |
| JP | 2022033717 | A * | 3/2022 | F16D 43/26 |
| SE | 522629 | C2 * | 2/2004 | F02D 15/04 |
| WO | WO-0194766 | A1 * | 12/2001 | F02D 15/04 |
| WO | WO-2015047420 | A1 * | 4/2015 | F01B 21/02 |
| WO | WO-2015191309 | A1 * | 12/2015 | F01L 1/352 |
| WO | WO-2016121424 | A1 * | 8/2016 | F01B 31/14 |
| WO | WO-2017145736 | A1 * | 8/2017 | F02B 75/04 |
| WO | WO-2019167591 | A1 * | 9/2019 | F02D 15/02 |
| WO | WO-2019176401 | A1 * | 9/2019 | F02B 75/045 |
| WO | WO-2020129661 | A * | 6/2020 | F02D 15/02 |

* cited by examiner

CRANKTRAIN PHASE ADJUSTER FOR VARIABLE COMPRESSION RATIO

INCORPORATION BY REFERENCE

This application claims priority to U.S. Provisional Application No. 63/087,916, which was filed on Oct. 6, 2020, and is incorporated herein by reference in its entirety.

FIELD OF INVENTION

This disclosure is generally related to a phase adjuster for a crank train that is configured to vary a compression ratio of an internal combustion (IC) engine.

BACKGROUND

Variable compression ratio (VCR) adjusters in IC engines are generally used in order to provide improved efficiency and fuel consumption as compared to an engine with a fixed compression ratio. VCR adjustment assemblies can rely on a variety of structures and configurations for varying the compression ratio.

Known VCR adjustment systems typically require components that are formed via casting or machining from solid, which can be expensive. It would be desirable to provide an affordable and compact phase adjuster assembly for a cranktrain to implement VCR in an IC engine.

SUMMARY

A phase adjuster assembly configured to adjust a phase between a driving component and a driven component of an internal combustion engine is generally provided. The assembly includes an input gear assembly comprising an input gear configured to engage a driving component, and a spline carrier. An output gear assembly includes an output gear configured to engage a driven component, and a drive plate configured to drivingly engage with the spline carrier. The drive plate is formed as a stamped component. Additional other components of the assembly can also be formed as stamped components.

The assembly further includes a support plate that is connected to the output gear and the drive plate. The support plate is configured to provide a support surface relative to the input gear assembly. The support plate can also be formed as a stamped component.

A bearing assembly can be provided between the support plate and an input hub of the input gear assembly. Multiple other bearing components can be implemented throughout the assembly, as described herein.

The drive plate can include a first radial section connected to the output gear, an axial section defining a spline configured to provide a driving connection with the input gear assembly, and a second radial section.

A plurality of biasing elements can be arranged axially between the second radial section of the drive plate and the spline carrier.

A piston shaft is attached to the input gear assembly at a first axial end, and a piston assembly is attached to a second axial end of the piston shaft. The piston assembly includes a thrust plate, and the piston shaft is retained with the piston assembly via at least one tab formed on the thrust plate. The tab can be formed as an integral part of the thrust plate and can be formed as a bent radial flange.

The piston assembly further comprises a piston plate attached to the thrust plate via a rivet. The second axial end of the piston shaft includes a flange, and the piston assembly further comprises a pair of axial bearings arranged on opposite axial sides of the flange of the piston shaft, with at least one thrust retainer plate arranged between the at least one tab and the thrust plate.

An input housing assembly can be provided in which the input gear is arranged. The input housing assembly includes an input housing and an input housing plate. The input housing can be formed via casting and the input housing plate can be formed via stamping, in one aspect.

The input gear assembly can further comprise an input hub fixed to a radially inner surface of the input gear via a welded connection, and a spline shaft connected to the input hub via a first connection. The first connection can include a helical tooth mating connection between the input hub and the spline shaft. The spline shaft is generally configured to transmit torque to the spline carrier via a second connection. The second connection can be a welded connection.

A method of assembling a phase adjuster assembly is also provided herein. The method includes inserting a piston assembly into an oil control valve (OCV) assembly. An axial end of a piston shaft is attached to the piston assembly, and the piston assembly includes a piston plate attached to a thrust plate via a rivet. The thrust plate includes at least one tab configured to attach the piston assembly to the piston shaft. The method includes arranging an output gear assembly over the piston shaft. The output gear assembly includes an output gear and a drive plate including a spline configured to provide a driving connection with an input gear assembly. The output gear and the drive plate are connected to each other via at least one connector. The method includes attaching the input gear assembly to another axial end of the piston shaft.

Additional embodiments are described below and in the claims.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
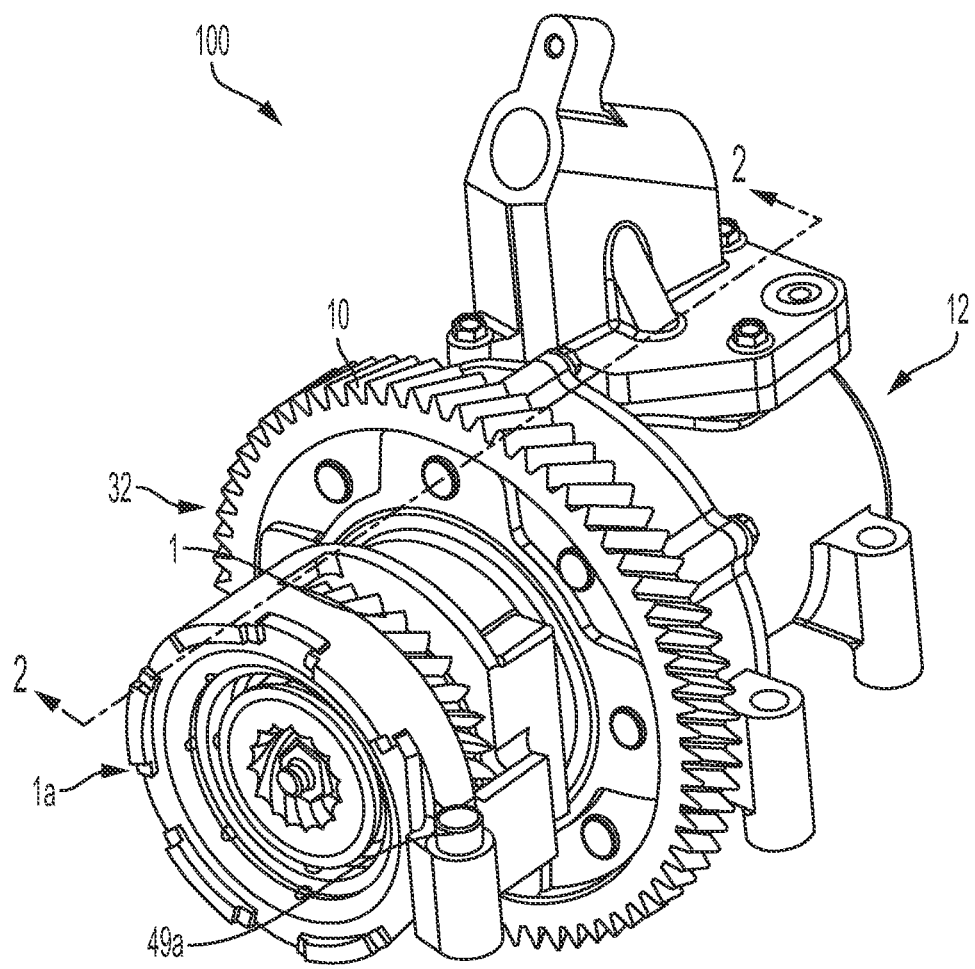
FIG. 1 is a perspective view of a phase adjuster according to one embodiment.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. This terminology includes the words specifically noted above, derivatives thereof and words of similar import.

Figure 8:
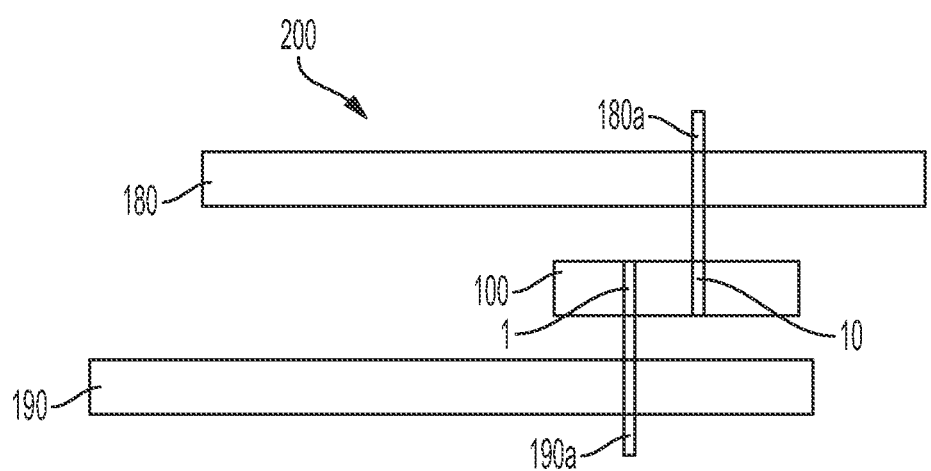
FIG. 8 is a schematic view of a cranktrain configured for use with the phase adjuster of FIG. 1.

FIG. 1 is a perspective view of a phase adjuster 100 that can be used with a cranktrain. A schematic diagram is shown in FIG. 8 that shows the phase adjuster 100 installed relative to a cranktrain 200 including a crankshaft 190, and an eccentric shaft 180. The phase adjuster 100 is generally configured to adjust phasing between the crankshaft 190 and the eccentric shaft 180.

FIG. 8 is a schematic drawing and the exact positioning of components relative to each other can vary. The phase adjuster 100 is operatively connected to both the crankshaft 190 and the eccentric shaft 180. The connection or interface between the phase adjuster 100 and the crankshaft 190 and the eccentric shaft 180 can be achieved in a variety of ways as one of ordinary skill in the art would appreciate based on this disclosure. Additionally, the phase adjuster 100 can be arranged between different driving components and different driven components besides a crankshaft and an eccentric shaft.

In one aspect, the phase adjuster 100 includes at least one gear configured to operatively connect the crankshaft 190 to the eccentric shaft 180. The gear train can comprise gears, such as an input gear 1, an output gear 10, an eccentric shaft gear 180a, a crankshaft gear 190a, which are shown in FIG. 8 for illustrative purposes. The ratio and sizing of the gears 1, 10, 180a, 190a can vary, as one of ordinary skill in the art would recognize. One of ordinary skill in the art would also recognize based on this disclosure that other driving engagements can be provided.

Figure 2:
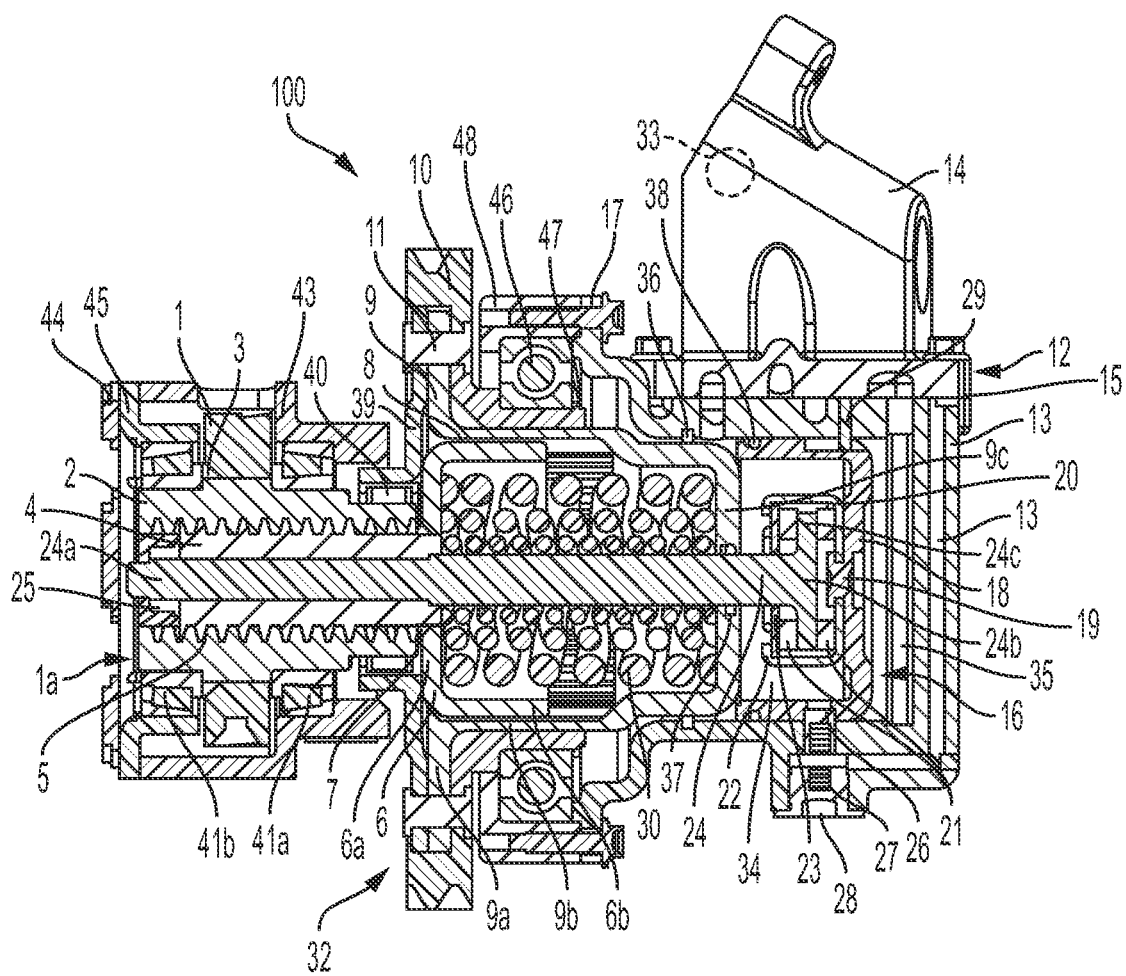
FIG. 2 is a cross-sectional view along line "FIG. 2" from FIG. 1.
Figure 3:
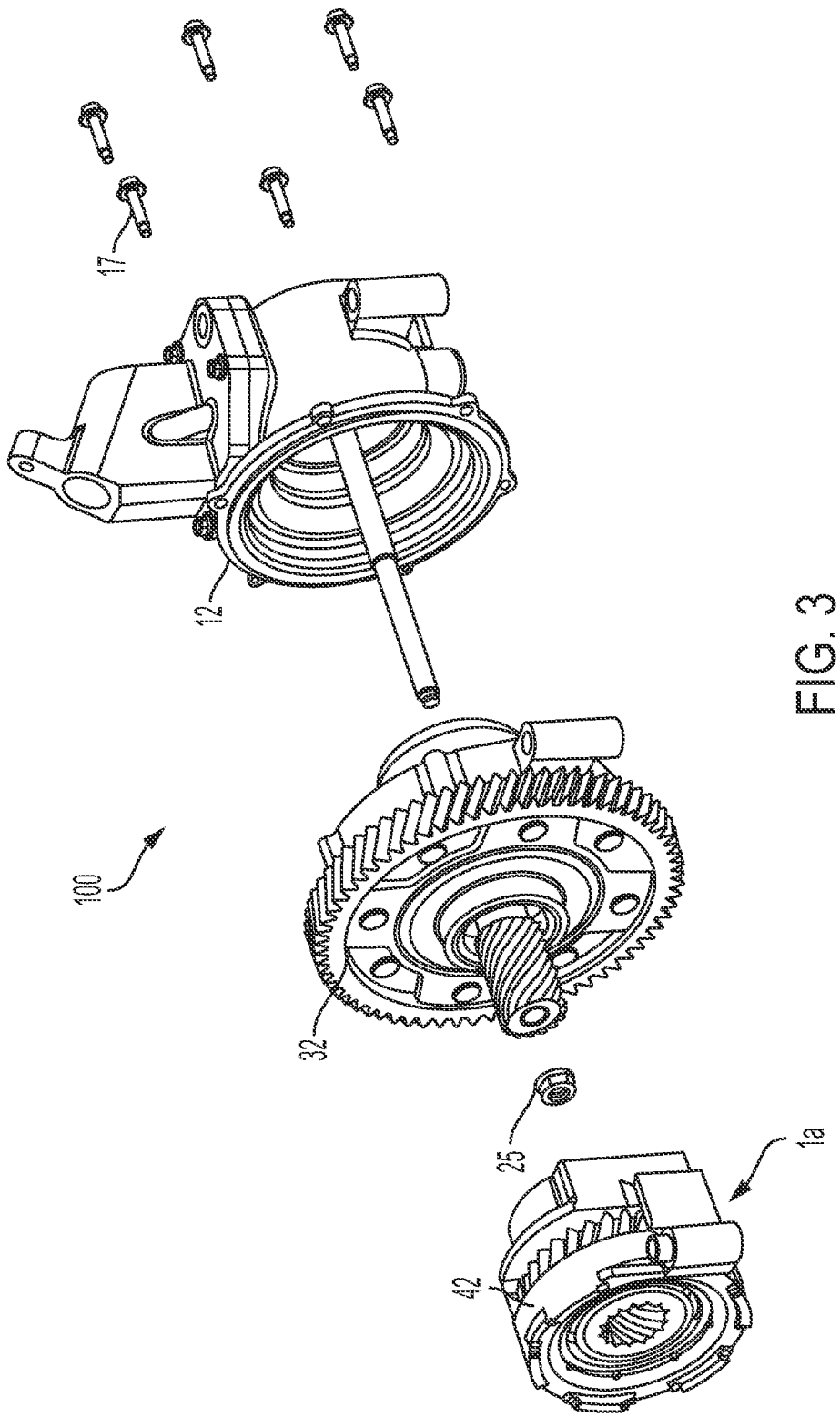
FIG. 3 is an exploded view of an input gear assembly, output gear assembly, and OCV assembly for the phase adjuster of FIG. 1.

As shown in FIGS. 1-3, the phase adjuster 100 can generally include an input gear assembly 1a, an output gear assembly 32, and an OCV assembly 12. The input gear assembly 1a includes an input gear 1 that is configured to engage with a driving component, such as a crankshaft, and provide an input torque to the system. The input gear 1 is connected to an input hub 2 via a connection 3. In one aspect, the connection 3 is provided via a welded connection. In another aspect, the connection 3 is provided via a press fit. One of ordinary skill in the art would understand that other types of connections can be used to join the input gear 1 to the input hub 2.

Torque is transmitted from the input hub 2 into a spline shaft 4 through a first connection 5 and into a spline carrier 6 through a second connection 7. The spline shaft 4 is formed separately from the input gear 1, in one aspect. As shown in FIG. 2, the spline shaft 4 and the spline carrier 6 are also formed as separate components. In one aspect, the first connection 5 is provided via a mating connection having helical teeth. For example, helical gears can be formed on an inner surface of the input hub 2 and on an outer surface of the spline shaft 4. In one aspect, the second connection 7 is provided via a welded connection. The second connection 7 can be formed via a press fit, in another aspect. In one aspect, the input gear assembly 1a includes the input gear 1 itself, as well as the input hub 2, the spline shaft 4, and the spline carrier 6. One of ordinary skill in the art would understand that the input gear assembly 1a could include additional components.

The spline carrier 6 can be formed as a stamped component. In one example, the spline carrier 6 is formed from stamped sheet metal. The spline carrier 6 can include a radial flange 6a and an axial flange 6b. The radial flange 6a can be connected to the spline shaft 4 via the connection 7. The axial flange 6b of the spline carrier 6 can include an external spline 8 that is configured to drivingly engage or connect with a drive plate 9, which is a component of the output gear assembly 32. The drive plate 9 can be formed as a stamped component with a mating internal spline that engages with the external spline 8 of the spline carrier 6. The drive plate 9 is configured to transmit torque to the output gear 10. The output gear 10 can be configured to drive a driven component, such as an eccentric shaft.

In one aspect, the drive plate 9 is configured to be connected to the output gear 10 via at least one fastener or connector 11. The fastener or connector 11 can be a rivet. A support plate 39 can also be provided that is also connected to the output gear 10 and the drive plate 9 via the fastener or connector 11. The fastener or connector 11 can be include a plurality of rivets in one aspect.

The drive plate 9 can include a first radial section 9a configured to connect the drive plate 9 to the output gear 10, an axial section 9b that defines the spline configured to engage the external spline 8 of the spline carrier 6, and a second radial section 9c. The first radial section 9a is defined on a first axial end of the axial section 9b and the second radial section 9c is defined on a second opposite axial end of the axial section 9b.

The output gear 10 can be generally connected to the drive plate 9 and the support plate 39 in order to form the output gear assembly 32. In one aspect, the drive plate 9 is considered a drive element that is configured to drivingly engage with at least one component of the input gear assembly 1a. The drive plate 9 and the support plate 39 can both be formed as stamped components. For example, the drive plate 9 and the support plate 39 can be formed as stamped sheet metal components. The output gear assembly 32 is shown in more detail in FIG. 4, and additional aspects of the output gear assembly 32 are described herein.

Figure 6:
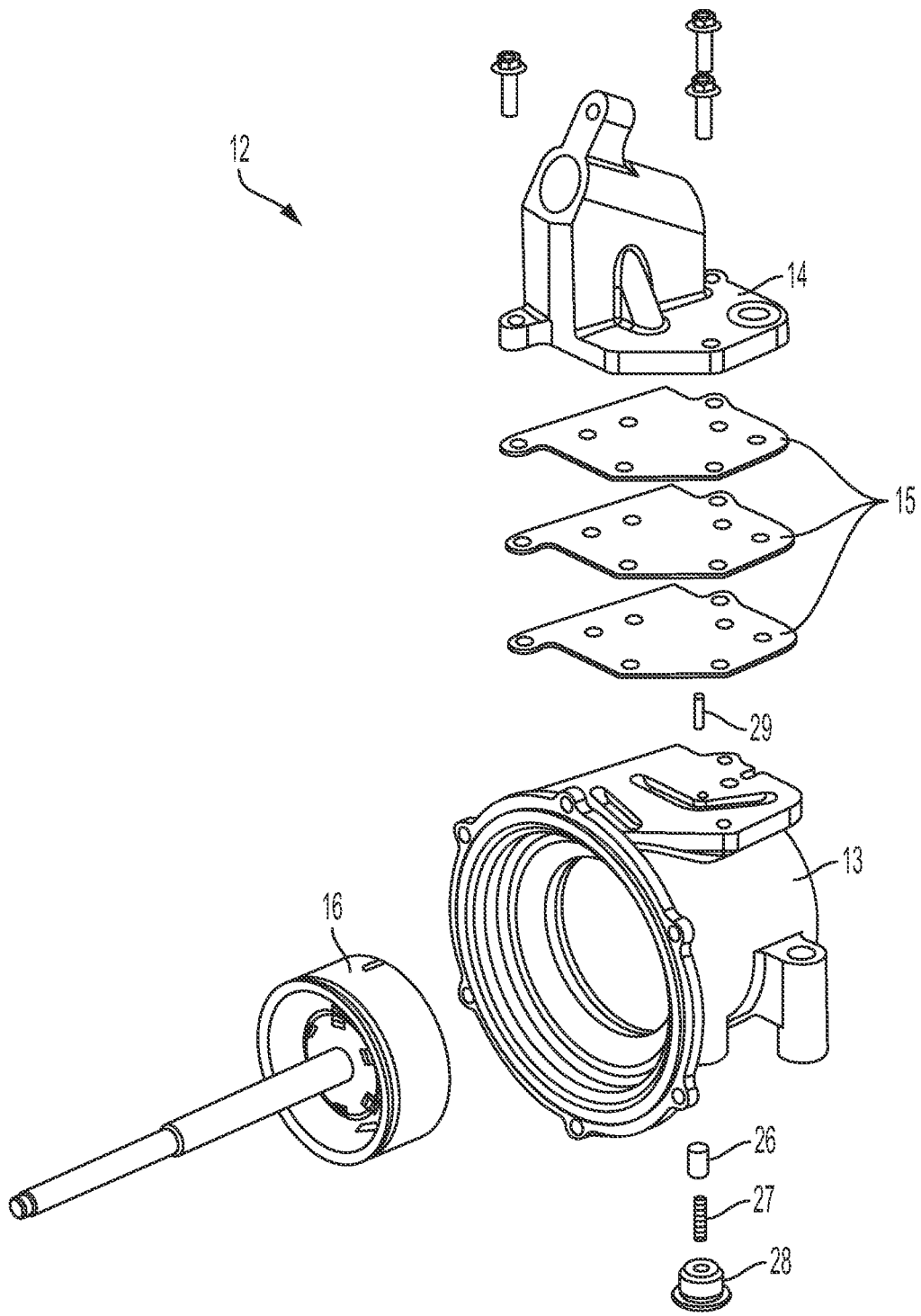
FIG. 6 is an exploded view of the OCV assembly for the phase adjuster of FIG. 1.

The OCV assembly 12 includes an OCV housing 13, a hydraulic manifold 14, at least one gasket 15, and a piston assembly 16. The OCV assembly 12 is shown in more detail in FIG. 6. As shown in FIG. 6, the at least one gasket 15 can include a plurality of gaskets. The OCV assembly 12 is attached to the output gear assembly 32 through at least one connector 17. In one aspect, the at least one connector 17 includes a plurality of bolts, as shown in FIG. 3.

Figure 7:
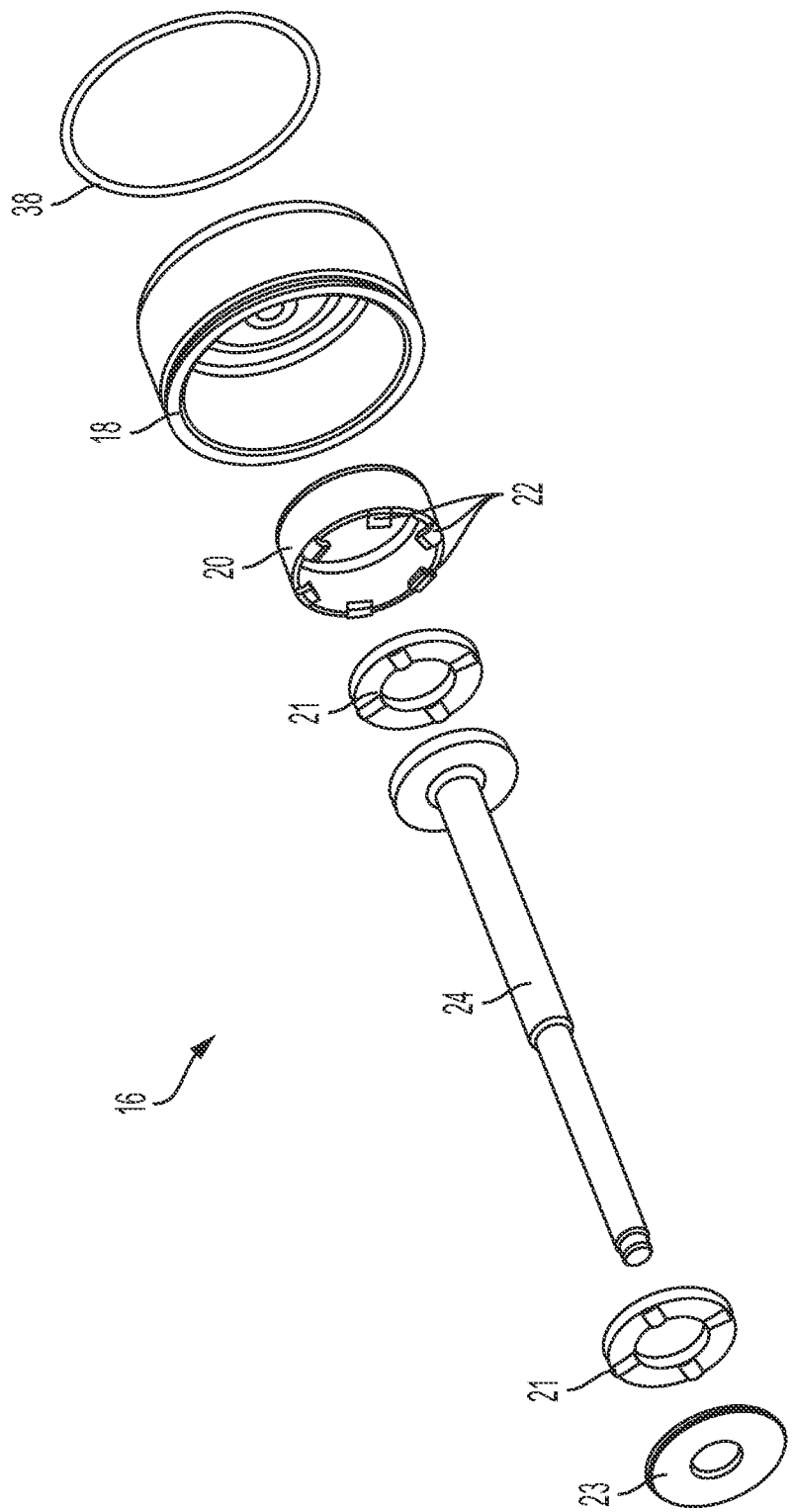
FIG. 7 is an exploded view of a piston assembly for the phase adjuster of FIG. 1.

The piston assembly 16, which is shown in more detail in FIG. 7, generally includes a piston plate 18 attached to a thrust plate 20. In one aspect, the piston plate 18 is attached to the thrust plate 20 via a connector or attachment element 19, such as a rivet 19. The connector 19 can be formed integrally with the piston plate 18. As shown in FIG. 2, the connector 19 can be arranged in a radially central portion of the piston plate 18. The piston plate 18 can be formed via stamping.

The piston assembly 16 also includes a piston shaft 24 that is generally configured to be retained by other portions of the piston assembly 16. The piston shaft 24 can be attached to the input gear assembly 1a at a first axial end 24a and attached to the piston assembly 16 at a second axial end 24b. In one aspect, the piston assembly 16 is assembled with two axial bearings 21, and the second axial end 24b of the piston shaft 24 is retained by at least one tab 22 formed on the thrust plate 20 and a thrust retainer plate 23. The at least one tab 22 can be formed via a radially inwardly directed flange. The at least one tab 22 can include a plurality of tabs, as shown in FIG. 7.

As shown in FIG. 2, the at least one tab 22 can be configured to secure the thrust retainer plate 23 with the axial bearings 21 and at least a portion of the piston shaft 24, such as a flange 24c formed on the second axial end 24b of the piston shaft 24. As described in more detail herein, the piston shaft 24 is then generally configured to be displaced in an axial direction based on hydraulic fluid flow. This assembly allows relative motion between the piston components and the piston shaft 24. The piston shaft 24 is configured to be secured to the spline shaft 4. In one aspect, the piston shaft 24 is attached to the spline shaft 4 via a fastener or securing means 25, such as a nut which is shown in FIGS. 2 and 3, after assembly.

The piston assembly 16 can include a stop assembly that includes a stop pin 26 and a stop pin spring 27 retained by a stop spring plug 28. The stop pin 26 is configured to engage the piston assembly 16 at a defined position when oil pressure drops or is lost, and the engine is shut off. This configuration ensures that a proper compression ratio is available at engine startup. The piston assembly 16 can also include at least one anti-rotation pin 29 between the piston plate 18 and the OCV housing 13 to prevent the piston plate 18 from spinning within the OCV housing 13 due to drag torque through the axial bearings 21.

Figure 4:
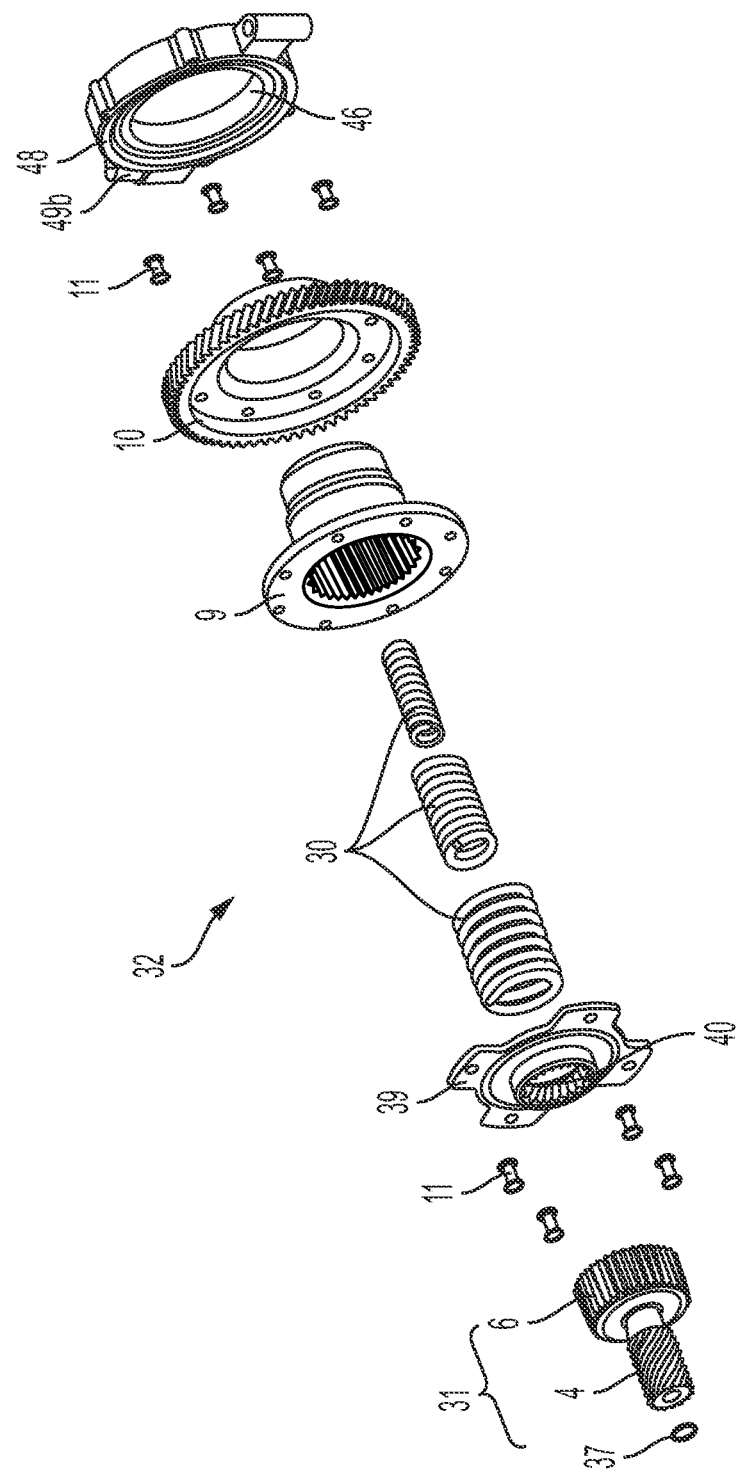
FIG. 4 is an exploded view of the output gear assembly for the phase adjuster of FIG. 1.

As shown in FIG. 2, a plurality of biasing elements 30, such as nested coil springs, are configured to preload a spline shaft assembly 31, which includes the spline shaft 4 and the spline carrier 6 (collectively annotated as element 31 in FIG. 4), against the drive plate 9 and bottoms out against the support plate 39. As shown in FIG. 4, the plurality of biasing elements 30 can include at least three springs of varying diameters. One of ordinary skill in the art would recognize from this disclosure that the configuration of the biasing elements 30 can vary.

As shown in FIG. 2, the biasing elements 30 are configured to engage between the second radial section 9c of the drive plate 9 and both the spline shaft 4 and the spline carrier 6. In one aspect, the biasing elements 30 ensure that a default phase angle of the input side (i.e. the input gear assembly 1a) to the output side (i.e. the output gear assembly 32) is in a high compression ratio state. One of ordinary skill in the art would understand that in an alternative arrangement, the system could be biased in an opposite direction or configuration, depending on how a connection or linkage between crankshaft 190 and eccentric shaft 180 is arranged. While the engine is running, the input torque force develops an axial thrust force from the first connection 5. This axial force drives the spline shaft assembly 31 against the biasing elements 30 to decrease the compression ratio. As torque is transmitted through the input hub 2 and the spline shaft 4, the lead angle in both parts creates an axial force component against the biasing elements 30. In the absence of resisting or opposing hydraulic pressure, this causes the spline shaft assembly 31 to translate axially until an equilibrium point is reached against the biasing elements 30. As the spline shaft assembly translates, it also twists or rotates, thus causing phasing to occur between input and output gears 1, 10. The addition of hydraulic control provides improved control to either resist or allow motion of the spline shaft assembly in either direction.

A hydraulic fluid assembly can be provided to control the motion of the spline shaft assembly 31. For example, an oil control valve (OCV) 33 in the hydraulic manifold 14 can be provided that is configured to bias the flow of engine oil to either an advance chamber 34 or a retard chamber 35. Based on movement of the piston assembly 16, the piston shaft 24 is correspondingly displaced in the axial direction. The spline shaft assembly 31, i.e. the spline shaft 4 and the spline carrier 6, which is attached to the piston shaft 24 via the fastener 25, is therefore also axially displaced based on the piston assembly 16. In one aspect, the axial position of the spline shaft assembly 31, which corresponds to an amount of phasing, can be controlled by controlling the flow of fluid to the advance and retard chambers 34, 35. Axial movement of the piston shaft 24 causes the output gear 10 to phase or shift relative to the input gear 1. One of ordinary skill in the art would understand that other types of axial actuators could be implemented to control the displacement of the piston shaft 24.

Additional components can be used in the assembly to control fluid flow relative to the advance and retard chambers 34, 35. For example, a first seal 36, such as a dynamic seal, can be provided at an interface defined between a radially outer surface of the drive plate 9 and a radially inner surface of OCV housing 13. The first seal 36 can have a square or rectangular radial cross-section, in one aspect, and can also be formed from polytetrafluoroethylene (PTFE). A second seal 37, such as an o-ring, can be provided between a radially inner surface of the drive plate 9 and a radially outer surface of the piston shaft 24. The second seal 37 can be configured to keep pressure in the advance chamber 34. A third seal 38, such as an o-ring, can be arranged between a radially outer surface of the piston plate 18 and a radially inner surface of the OCV housing 13. In one aspect, the third seal 38 is configured to seal the advance and retard chambers 34, 35 relative to each other.

Various bearing configurations are implemented throughout the phase adjuster 100 in order to support one component relative to another. As shown in FIG. 2, a support element, such as a bearing assembly 40, can be provided at an interface between the input hub 2 and the support plate 39 in order to support the output gear 10.

A pair of tapered roller bearings 41a, 41b can be arranged on either axial side of the input gear 1 and can be configured to support the input gear 1 relative to an engine block through an input housing assembly 42, which includes an input housing 43 and an input housing plate 45. The input housing assembly 42 is shown in more detail in FIG. 5. In one aspect, the input housing 43 is connected, such as via staking or riveting, to the input housing plate 45. The input housing plate 45 can be formed as a stamped sheet metal component. In one aspect, the connection between the input housing 43 and the input housing plate 45 also provides a preload for the tapered roller bearings 41a, 41b. A connection 44 between the input housing 43 and the input housing plate 45 can be provided via staking. During assembly, prior to staking the input housing plate 45 to the input housing 43, a predetermined force can be applied against the tapered roller bearings 41a, 41b, and then the input housing plate 45 can be staked to the input housing 43 such that a preload remains for the tapered roller bearings 41a, 41b.

Figure 5:
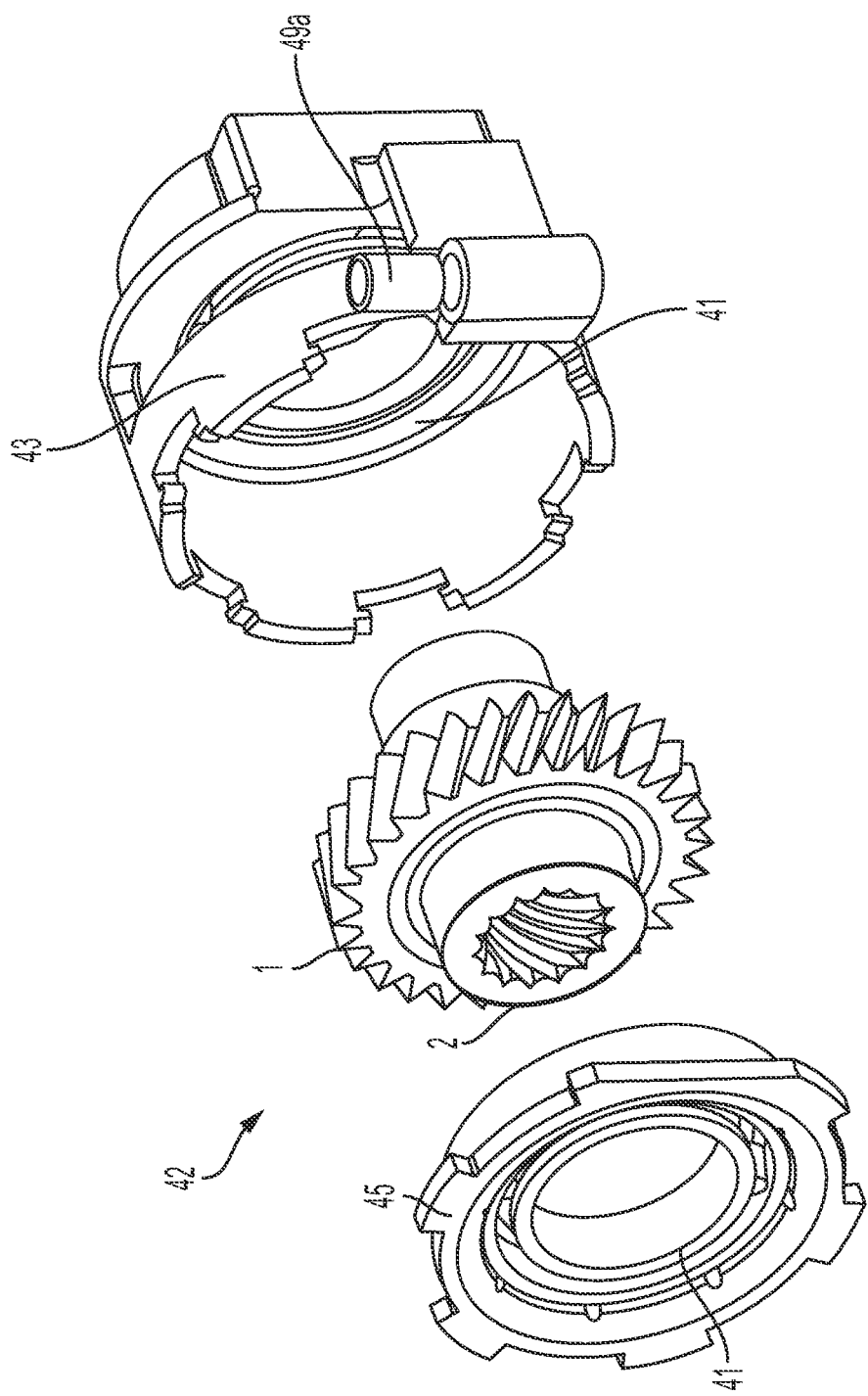
FIG. 5 is an exploded view of the input gear assembly for the phase adjuster of FIG. 1.

Another bearing assembly 46, such as a multi-contact bearing assembly, can be arranged to provide support between the output gear 10 and the engine block. In one aspect, the bearing assembly 46 is a four-point contact bearing assembly. As shown in FIG. 2, the bearing assembly 46 is arranged between an abutment or shoulder 47 formed on the output gear 10, and an output gear housing 48. As shown in FIGS. 1 and 5, alignment pins 49a, 49b can be provided to align the output gear housing 48 and the input gear housing 43 to the engine block.

In one aspect, the input housing 43 and the output gear housing 48 can be produced via casting. One of ordinary skill in the art would understand that the input housing 43 and the output gear housing 48 can be formed by other processes.

As one of ordinary skill would appreciate, various types of rolling arrangements or bearing assemblies can be used for the bearing components, i.e. elements 21, 40, 41a, 41b, and/or 46.

In order to assemble the phase adjuster 100, the piston assembly 16 can first be inserted into the OCV assembly 12. During this step, the stop pin 26 and the anti-rotation pins 29 can be aligned. The output gear assembly 32 can then be installed over the piston shaft 24 and clamped together with both the fastener 25 and the connector 17 to the output gear housing 48. Finally, the input housing assembly 42 can be installed onto the spline shaft 4.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS input gear assembly 1a
input gear 1
input hub 2
connection 3
spline shaft 4
first connection 5
spline carrier 6
radial flange 6a of spline carrier
axial flange 6b of spline carrier
second connection 7
external spline 8
drive plate 9
output gear 10
fastener or connector 11
oil control valve (OCV) assembly 12
OCV housing 13
hydraulic manifold 14
gasket 15
piston assembly 16
connector 17
piston plate 18
connector 19
thrust plate 20
axial bearings 21
at least one tab 22
thrust retainer plate 23
piston shaft 24
fastener 25
stop pin 26
stop pin spring 27
stop spring plug 28
anti-rotation pin 29
biasing elements 30
spline shaft assembly 31
output gear assembly 32
oil control valve (OCV) 33
advance chamber 34
retard chamber 35
first seal 36
second seal 37
third seal 38
support plate 39
bearing assembly 40
tapered roller bearings 41a, 41b
input housing assembly 42
input housing 43
input housing plate 45
bearing assembly 46
shoulder 47
output gear housing 48
alignment pins 49a, 49b
phase adjuster 100
eccentric shaft 180
gear 180a
crankshaft 190
gear 190a
cranktrain 200

What is claimed is:

1. A phase adjuster assembly configured to adjust a phase between a driving component and a driven component of an internal combustion engine, the phase adjuster assembly comprising:
    an input gear assembly comprising an input gear configured to engage the driving component, and a spline carrier, and
    an output gear assembly comprising an output gear configured to engage the driven component, and a drive plate configured to drivingly engage with the spline carrier,
    wherein the output gear and the drive plate are formed separately from each other, and the drive plate is a stamped component.

2. The phase adjuster assembly according to claim 1, wherein the output gear assembly further comprises a support plate that is connected to the output gear and the drive plate, wherein the support plate is configured to provide a support surface relative to the input gear assembly.

3. The phase adjuster assembly according to claim 2, wherein the support plate is formed as a stamped component.

4. The phase adjuster assembly according to claim 2, further comprising a bearing assembly, wherein the input gear assembly further comprises an input hub connected to the input gear, and the bearing assembly is arranged between the support plate and the input hub.

5. The phase adjuster assembly according to claim 1, wherein the drive plate includes a first radial section connected to the output gear, an axial section defining a spline configured to provide a driving connection with the input gear assembly, and a second radial section.

6. The phase adjuster assembly according to claim 5, further comprising a plurality of biasing elements arranged axially between the second radial section of the drive plate and the spline carrier.

7. The phase adjuster assembly according to claim 1, further comprising a piston shaft attached to the input gear assembly at a first axial end, and a piston assembly attached to a second axial end of the piston shaft, the piston assembly including a thrust plate, and the piston shaft being retained with the piston assembly via at least one tab formed on the thrust plate.

8. The phase adjuster assembly according to claim 7, wherein the piston assembly further includes a piston plate attached to the thrust plate via an integrally formed connector.

9. The phase adjuster assembly according to claim 7, wherein the second axial end of the piston shaft includes a flange, the piston assembly further includes a pair of axial bearings arranged on opposite axial sides of the flange of the piston shaft, and at least one thrust retainer plate arranged between the at least one tab and the thrust plate.

10. The phase adjuster assembly according to claim 1, further comprising an input housing assembly in which the input gear is arranged, the input housing assembly including an input housing and an input housing plate, wherein the input housing is formed via casting and the input housing plate is formed via stamping, and the input housing plate is retained with the input housing via a connection formed by staking.

11. The phase adjuster assembly according to claim 1, wherein the input gear assembly further includes an input hub fixed to a radially inner surface of the input gear via a welded connection, and a spline shaft connected to the input hub via a first connection.

12. The phase adjuster assembly according to claim 11, wherein the first connection includes a helical tooth mating connection between the input hub and the spline shaft.

13. The phase adjuster assembly according to claim 11, wherein the spline shaft is configured to transmit torque to the spline carrier via a second connection.

14. The phase adjuster assembly according to claim 13, wherein the second connection is a welded connection.

15. A method of assembling a phase adjuster assembly, the method comprising:
  inserting a piston assembly into an oil control valve (OCV) assembly, wherein an axial end of a piston shaft is attached to the piston assembly, and the piston assembly includes a piston plate attached to a thrust plate via a connector integrally formed with the piston plate, and the thrust plate includes at least one tab configured to attach the piston assembly to the piston shaft;
  arranging an output gear assembly over the piston shaft, the output gear assembly comprising an output gear and a drive plate including a spline configured to provide a driving connection with an input gear assembly, wherein the output gear and the drive plate are connected to each other via at least one connector; and
  attaching the input gear assembly to another axial end of the piston shaft.

16. The method according to claim 15, wherein the input gear assembly comprises an input housing and an input housing plate that are connected to each other via staking, wherein the input housing is formed via casting and the input housing plate is formed via stamping.

17. The method according to claim 16, wherein the connection between the input housing and the input housing plate provides a preload for a pair of tapered roller bearings on either axial side of an input gear of the input gear assembly.

18. The method according to claim 15, wherein the at least one tab is formed via a bent radial flange.

19. The method according to claim 15, wherein the drive plate includes a first radial section connected to the output gear, an axial section defining a spline configured to provide a driving connection with the input gear assembly, and a second radial section.

20. The method according to claim 19, wherein the input gear assembly includes a spline carrier, and the assembly further comprising a plurality of biasing elements arranged axially between the second radial section of the drive plate and the spline carrier.

* * * * *